INVENTOR.
LEWIS H. RUPLE
BY
Fraser & Fraser
ATTORNEYS

July 5, 1966 L. H. RUPLE 3,258,952
UPPER WELD PRESSURE ROLL ASSEMBLY
Filed April 8, 1964 3 Sheets-Sheet 2

INVENTOR.
LEWIS H. RUPLE
BY
*Fraser & Fraser*
ATTORNEYS

United States Patent Office 3,258,952
Patented July 5, 1966

3,258,952
UPPER WELD PRESSURE ROLL ASSEMBLY
Lewis H. Ruple, Perrysburg, Ohio, assignor to Abbey Etna Machine Company, Perrysburg, Ohio, a corporation of Ohio
Filed Apr. 8, 1964, Ser. No. 358,315
1 Claim. (Cl. 72—225)

This invention relates to apparatus for producing tubular stock and more particularly to tube mills in which a tube is formed from a flatstrip or ribbon of metal so that the free edges are brought into juxtaposed position and are subsequently welded together to form a continuous tube; the operation being a continuous one wherein the flat strip is fed in at one end of the mill and the finished welded seam tubing is discharged from the opposite end of the mill. The invention is particularly concerned with the mounting of the upper pressure roll assembly which exerts pressure upon the tube at the time of welding and holds the welded edges together during the welding operation.

When using direct current or relatively low frequency alternating current, rotary electrodes engaging the tube adjacent the abutting edges at the pressure rolls are used to effect the welding current flow across the tube edges. Each welding setup involves a pair of coaxial rotary electrodes electrically isolated from each other and having transversely arcuate peripheries engaging the tube adjacent the abutting edges over an arcuate extent sufficient to provide an electrode-to-tube contact arc large enough to prevent arcing and burning at the contact area.

The portion of the tube periphery not in pressure engagement with the electrodes is substantially all confiningly engaged by the transversely arcuate peripheries of the cooperating pressure rolls. In a typical installation, there may be two of these pressure rolls, one on each side of the tubing, rotating on vertical axes plane of the electrodes. The peripheries of the two pressure rolls are substantially contiguous at a line on the tube surface diametrically opposite the welding seam, and the periphery of each roll contacts the tube over an arc substantially in excess of 90 degrees and terminating just short of the arc engaged by the welding electrode on the same side of the seam. The arrangement of the welding electrodes and pressure rolls substantially in a common axial plane constitutes what is known, to those skilled in the art of electric resistance welded tubing, as a "welding throat." It will be observed that the combination of welding electrodes and pressure rolls at the welding throat confines the tubing throughout a major part of its circumference sufficiently approximating 360 degrees that the tube may be said to be completely confined peripherally. The totality of peripheral confinement of the tube is interrupted only by the necessary small clearances between peripheral portions of adjacent electrodes and pressure rolls.

However, in electric resistance welding tubes using alternating currents at a frequency of from the order of approximately 1 to 450 or more kilocycles, the current is not introduced into the tubing at the zone where the converging tubing edges initially engage each other. At these high frequencies, the current follows the path of lowest inductance rather than the path of least resistance. The path of least inductance is that parallel to the return flow path of the current. Advantage is taken of this factor by introducing the current to the spaced tube edges upstream from their point of contact at the pressure roll zone, so that the current, due to the "skin effect" particularly characteristic of high frequency alternating current, flows along the surface of the converging strip edges to the point of contact thereof at the pressure roll zone. This "skin effect" concentrates the heating effect of the current in the strip edges, raising the latter rapidly to a high temperature with the heating of the strip or tube being confined to extremely narrow zones along the converging edges. As a result, an efficient heating of the edges to be weld united is effected with a greatly reduced electric power consumption in the tube being welded as compared to resistance welding with direct current and low frequency alternating current.

As the current is introduced to the work at a point spaced upstream from the welding throat in this method of electric resistance welding, there are no rotary electrodes at the welding throat. Consequently, other arrangements must be provided for circumferentially confining the tube at the welding throat. The welding throat arrangement usually used in high frequency A.C. resistance welding of tubes comprises a pair of cooperating pressure or squeeze rolls each engaging the tube over substantially one-half of its circumference, the adjacent upper and lower peripheries of the rolls being slightly spaced from each other for clearance purposes. While generally satisfactory otherwise, this two-roll welding throat arrangement has certain disadvantages when used in high frequency A.C. resistance welding of steel tubes.

More specifically, due to the combined effects of the squeeze pressure and the difference in peripheral speeds of the upper arc of the tube, centered on the weld zone, and the overlying portions of the squeeze rolls, metal galling occurs at the upper peripheral edges or corners of the squeeze rolls at the weld zone. It will be appreciated that, in the case of a roll having a concave periphery engaging the tube and with the midpoint of this periphery traveling at the same linear speed as the tubing, the extremities of the roll periphery will have a linear speed in excess of that of the tube.

This galling of the squeeze rolls results in scratching of the outer surface of the tube to an extent where the surface quality of the tubing is unacceptable. To avoid such galling, the peripheral corners of the squeeze rolls, at the tubing surface, have been relieved to a larger radius. While this procedure alleviated the galling, it altered the shape of the tube-confining throat surface and, under the pressures involved in making the weld, "peaked" welds were formed with the tube being out of round at the weld. Also, with this type roll construction there is no means of applying downward pressure on the strip edges to effect welding pressure.

Immediately after formation of the weld, the inside flash or excess weld metal is trimmed off by an inside bead trimmer. This trimmer has a cutting tool maintained precisely in position and with a precisely formed cutting edge so that the depth and shape of cut is such as to result in the inner surface of the tube being uniformly round. With the aforementioned "peaking" of the weld, the inside bead trimmer cannot effect the proper trimming of the weld to provide the uniformly round inner surface for the tube due to the out-of-round distortion of the tube at the weld.

Furthermore, the larger corner relief of the upper peripheries of the squeeze rolls contributes to the tendency to form a partially lapped weld, as opposed to a straight butt weld, where the edges are offset slightly.

To provide a welding throat for high frequency A.C. resistance welding of tubing avoiding the foregoing disadvantages, in accordance with the present invention, the arcuate extent of the squeeze roll peripheries is reduced so that these rolls engage the tubing over arcs reduced in size and a pair of pressure rollers is provided, independent of the squeeze rolls, engaging the portion of the tube adjacent the edges to be joined.

These pressure rollers are rotatably mounted in support elements adjustable vertically and horizontally with respect to the tube being formed either in a dependent fashion or independent of one another.

An object of the invention is to produce a new and improved mechanism by which the individual pressure rolls may be universally adjusted relative to the tube to be welded.

Another object is to produce a new and improved mechanism for rigidly mounting the upper weld pressure rolls of a tube mill relative to the axis of the tube being formed and permitting accurate adjustment thereto.

Still another object of the invention is to produce an apparatus for making welded tubing which is acceptable in quality of the exposed surfaces having no scratches or galling thereon.

Other objects and advantages of the invention will become readily apparent to one skilled in the art from reading the following detailed description of a preferred embodiment of the invention in connection with the accompanying drawings, in which—

Figure 1:
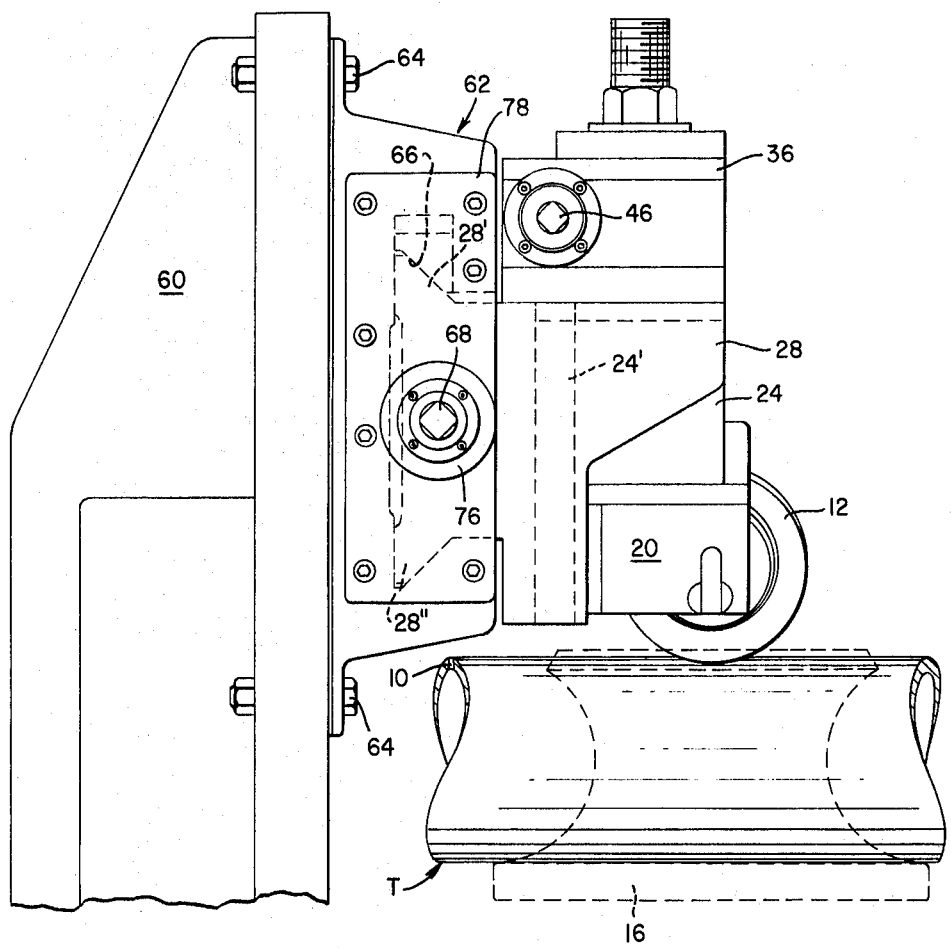
FIGURE 1 is a side elevational view of a portion of the tube mill showing the upper weld pressure roll assembly.

Referring to the drawings, an elongate tube T is shown, the same having been formed from a flat metallic ribbon, which through a series of forming rolls (not shown) is shaped progressively to a tubular form with the edges of the ribbon disposed uppermost in a position for welding. The longitudinal edges 10 of the tube T are spaced from one another and are gradually pressed together so that upon reaching the welding station, these edges are in abutting relation and in the proper position for welding. As shown, there is a pair of upper weld pressure rolls 12 and 14 disposed opposite each other and having their peripheral edge portions shaped to conform to the outside of the tube T. These rolls are designed principally to force the edges of the tube T into engagement and maintain this relationship during the welding operation.

Electric welding means such as welding electrodes (not shown) which contact the edges of the strip being formed as well as induction welding means which may typically surround at least a portion of the formed strip but are not in physical contact with the metal are disposed in close juxtaposition to the rolls 12 and 14 and are typically of the type for conveying electric current to the tube as the latter advances for effecting resistance welding of the tube as will be readily apparent to those skilled in this particular art. Typically, the aforementioned welding means are electrically connected to a transformer which together with the welding means are mounted for unitary universal movement with respect to the axis of the tube T on the base of the tube mill.

Disposed on opposite sides of the tube T and in axial alignment with the upper pressure rolls 12 and 14 is a pair of forming rolls 16 and 18 which cooperate to retain the desired cross sectional tubular configuration of the tube T prior to and during the welding operation. Suitable mechanism is provided for horizontal lateral transverse relative movement of the rolls 16 and 18 toward and away from the axis of the tube T by mechanism disposed in the support housing (not shown) beow the respective rolls. Also, if desired, longitudinal adjustment of the rolls 16 and 18 may be effected typically by a screw threaded shaft (not shown) in the support housing of the assembly.

The upper pressure applying roll members 12 and 14 are similarly mounted with respect to one another in suitable bearing assemblies carried by journal support members 20 and 22. It will be noted that the axes of rotation of the roll members 12 and 14 are angularly disposed toward one another. The journal support members 20 and 22 are made integral with respective slide members 24 and 26 which in turn are adapted to slide vertically within ways formed in the vertically extending support elements 28 and 30, respectively.

The rearwardly disposed portions of the slide member 24 is provided with oppositely extending shoulders 24' and 24''; while the slide member 26 is provided with similar oppositely extending shoulders 26' and 26''. These shoulders are adapted to slide vertically within the ways formed in the respective support elements 28 and 30.

Figure 2:
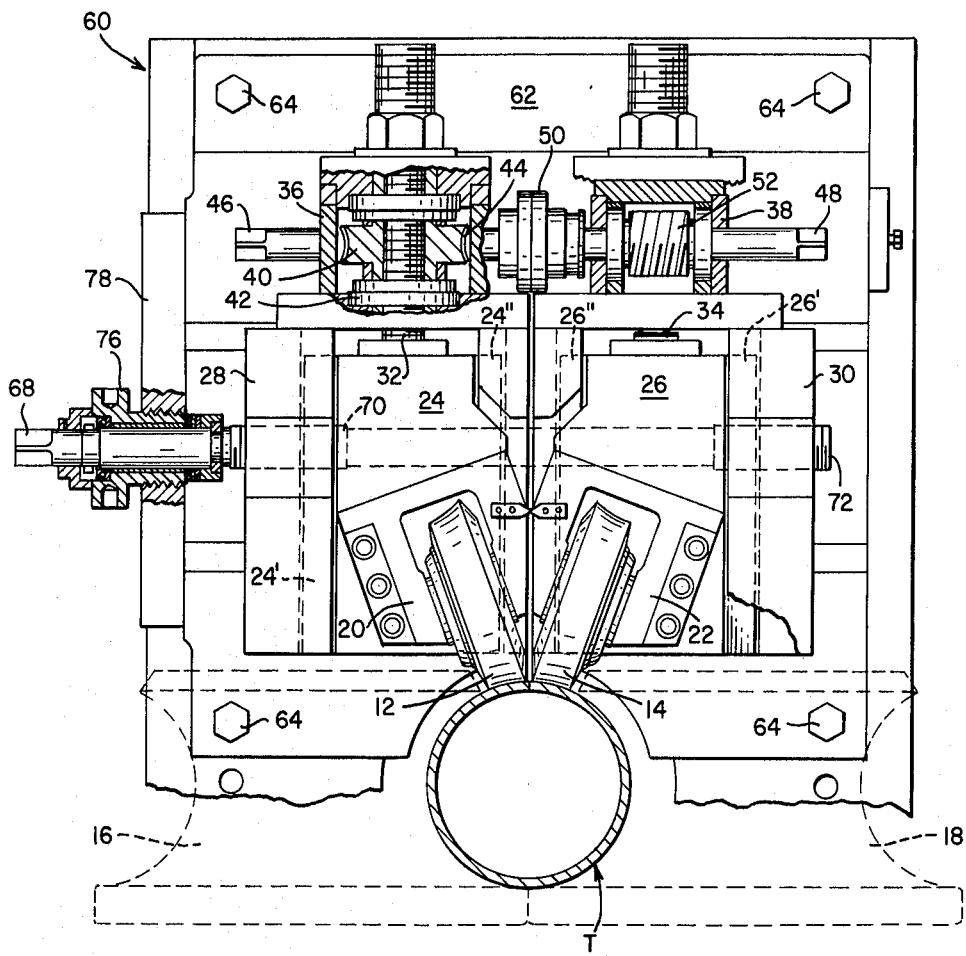
FIGURE 2 is a front elevational view of the assembly illustrated in FIGURE 1 with parts partially broken away to more clearly illustrate the invention.
Figure 3:
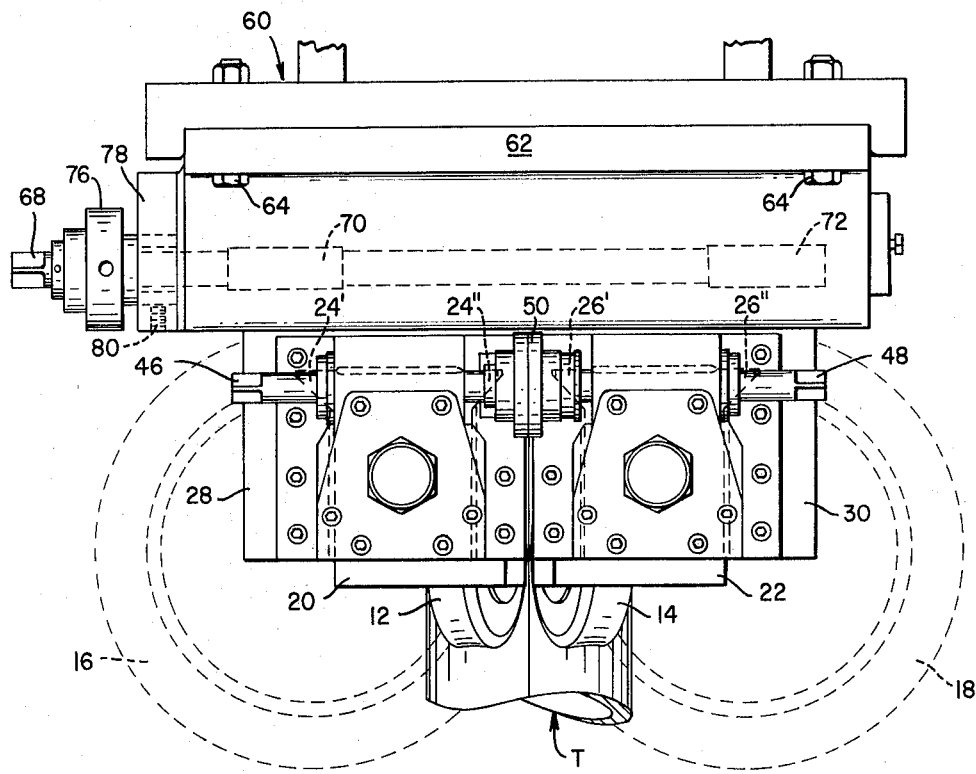
FIGURE 3 is a top plan view of the upper weld pressure roll assembly illustrated in FIGURES 1 and 2.

Integral with the top portion of each of the sliding elements 24 and 26 are vertically extending externally threaded shank members 32 and 34, respectively (illustrated in FIGURE 2). The upper portion of the elements 28 and 30 include integral housings 36 and 38, respectively, which contain gearing mechanism adapted to cooperate with respective ones of the threaded shank members 32 and 34. Since each of the gearing mechanisms is identical with the other, a portion is illustrated within the housing 36, while the remaining operative elements are illustrated within the housing 38. It will be understood that although the gearing mechanism is the same the sectional views are taken along different planes. Associated with each of the threaded shanks 32 and 34 is an internally threaded gear 40 mounted to rotate about a vertical axis within suitable bearing means 42. The gear 40 is provided with an annular arrangement of radially extending teeth 44. A transversely extending horizontal shaft 46 is journalled within the housing 36, while a similar shaft 48 is journalled within the housing 38. The shafts 46 and 48 are coupled together by a disconnect coupling 50 of the type manufactured and sold by Koppers, Inc. and identified commercially as a "Cut-Out" coupling. The coupling 50 provides a rapid means of connecting and disconnecting the shafts 46 and 48 without cumbersome and annoying separation of coupling sleeves and the like.

Each shaft 46 and 48 is provided with a worm 52 integrally affixed to the respective shaft and adapted to engage the respective worm gear 40. Normally, when the shaft 46 is turned by a crank or the like, the turning movement is transmitted to the associated shaft 48 through the coupling 50. As the shafts 46 and 48 are turned, so are the associated worms 52 causing the rotation of the worm gears 40 which in turn effect an up or down movement of the respective threaded shanks 32 and 34. It will be appreciated that the rotational movement of the shanks 32 and 34 will simultaneously effect up or down movement of the sliding elements 24 and 26 within the respective support elements 28 and 30. Manifestly, as the sliding elements 24 and 26 are caused to move, movement is likewise effected in the respective pressure rolls 12 and 14.

So long as the coupling 50 is in its connecting condition, rotational movement of either of the shafts 46 or 48 will effect simultaneous movement of the pressure rolls 12 and 14. However, if it is desired to effect relative adjustment of the rolls 12 and 14, the coupling 50 is uncoupled, allowing the shafts 46 and 48 to operate independently of one another. The shaft 46 controls the vertical adjustment of the pressure roll 12, and the shaft 48 controls the vertical movement of the pressure roll 14.

From the above description it will be apparent to those skilled in the art that the novel structure and method of operating the same is capable of imparting either simultaneous or individual vertical movement to the pressure rolls 12 and 14 relative to the tube T being formed. In order to effect transverse horizontal movement to the pressure rolls 12 and 14 relative to the tube T being formed, the above described structure is supported in a cantilevered fashion over the side forming rolls 16 and 18.

An upright member 60 extends upwardly from the base of the mill and is substantially yoke-shaped to provide an aperture for passage of the tubing T therethrough in spaced relation. On the upstream face of the upright member 60 there is a support element 62 which extends horizontally across the mill in spaced relation above the tube T being formed. The support element 62 is suitably affixed to the upright member by threaded fasteners 64, for example. The support element 62 is provided with a horizontally extending channel 66 having generally C-shaped cross-section, which functions as a way to slidably support the support elements 28 and 30. The support elements 28 and 30 have rearwardly disposed oppositely extending shoulders 28' and 28" which engage the upper and lower ways of the channel 66 of the element 62.

A shaft 68 is journalled within the side walls of the support element 62 and extends substantially the entire distance thereacross. The shaft 68 is provided with two spaced apart externally threaded portions 70 and 72 which are suitably machine formed therein or otherwise affixed thereto. One of the threaded portions 70, 72 is formed with a right-hand thread, while the other is formed with a left-hand thread. The threaded portion 70 engages an internally threaded passageway formed in the element 28, while the threaded portion 72 engages an internally threaded passageway formed in the element 30. If the shaft 68 is rotated by a crank, for example, in a clockwise direction, simultaneous movement of the elements 28 and 30 within the channel 66 toward one another is effected transversely of the axis of the tube T.

If, on the other hand, the shaft 68 is rotated in an opposite direction, the elements 28 and 30 are moved away from one another.

As mentioned hereinabove, the shaft 68 is journalled within the side walls of the support element 62. More specifically, the shaft 68 is journalled within an externally threaded bearing assembly 76 which is threadably engaged within a side plate 78. Normally, a set-screw 80 extends through the side plate 78 and engages a portion of the outer periphery of the bearing assembly 76 thereby militating against any relative movement between the bearing assembly and the plate. However, in the event it is desired to simultaneously move the elements 28 and 30 in the same horizontal direction relative to the axis of the tube T, the set-screw 80 is loosened and the entire bearing assembly 76 may be rotated one way or the other to effect the desired simultaneous movement of the support elements 28 and 30 and their associated pressure rolls 12 and 14. When the desired position is achieved, the set-screw 80 is once again tightened and the shaft 68 may be rotated to effect the movement of the pressure rolls 12 and 14 relative to one another. Manifestly, as the elements 28 and 30 are caused to be moved, their respective pressure rolls 12 and 14 are likewise caused to move relative to the axis of the tube T.

From the above description, it will be appreciated that the invention has produced a sturdy means of mounting the upper pressure roll assembly which consumes a minimum of space and provides for simultaneous or relative movement of the individual roll members relative to the axis of the tube being formed.

In accordance with the provisions of the patent statutes, I have explained the principles and mode of operation of my invention and have illustrated and described what I now consider to represent its best embodiment. However, I desire to have it understood that, within the scope of the appended claim, the invention may be practiced otherwise than as specifically illustrated and described.

What I claim is:

In a tube mill for producing tubular stock from a flat strip, the edges of which are gradually caused to converge and are thereafter welded together:

an upright rigid support member having a horizontally disposed way means extending over and substantially normal to the axis of travel of the strip through the mill and positioned at a point downstream from the tube welding station;

a pair of slides movable in said way means and provided with a passageway having at least two spaced oppositely threaded portions extending horizontally therethrough and said slides having vertically extending way means;

a shaft having oppositely threaded portions engaging the oppositely threaded portions respectively of said slides, whereby movement of said shaft in one direction causes said slides to move toward one another and in the other direction causes the slides to move away from one another;

a pair of laterally aligned squeeze rolls mounted to rotate about vertical axes, each of said squeeze rolls positioned to engage respective opposite surfaces of the tubing through an arc extending substantially from a point diametrically opposite the converging edges of the tubing to a point spaced from the converging edges of the tubing;

a pair of pressure rolls engaging respective ones of the edges of the tubing through an arc extending from the point adjacent the respective squeeze roll to the converging portion of the tubing, the longitudinal extensions of the axes of rotation of said pressure rolls forming an angle less than 180°;

a cantilevered support element for each of said pressure rolls, each element being slidably mounted in the vertically extending way means of a slide and including a vertically extending threaded shaft; and means associated with the vertically extending threaded shafts for effecting vertical movement of said support elements in the vertically extending way means of said slides to thereby simultaneously effect movement of said pressure rolls, said means for effecting vertical movement including a pair of horizontally extending threaded shafts and means for coupling and uncoupling said shafts to effect simultaneous or independent movement of said pressure rolls.

References Cited by the Examiner

UNITED STATES PATENTS

| Re. 25,771 | 4/1965 | Kohler | 219—59 |
| 658,741 | 9/1900 | Parpart | 219—59 |
| 666,157 | 1/1901 | Rietzel | 219—59 |
| 747,841 | 12/1903 | Baehr | 219—59 |
| 2,237,551 | 4/1941 | Darner | 219—59 |

FOREIGN PATENTS

| 632,823 | 7/1936 | Germany. |

CHARLES W. LANHAM, *Primary Examiner.*

H. D. HOINKES, *Examiner.*